(12) United States Patent
Tanii (10) Patent No.: US 9,812,740 B2
(45) Date of Patent: *Nov. 7, 2017

(54) BATTERY UNIT

(75) Inventor: Keiichi Tanii, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/371,708

(22) PCT Filed: Jan. 11, 2012

(86) PCT No.: PCT/JP2012/050392
§ 371 (c)(1),
(2), (4) Date: Jul. 10, 2014

(87) PCT Pub. No.: WO2013/105231
PCT Pub. Date: Jul. 18, 2013

(65) Prior Publication Data
US 2014/0335379 A1 Nov. 13, 2014

(51) Int. Cl.
*H01M 10/42* (2006.01)
*H01M 2/10* (2006.01)
(Continued)

(52) U.S. Cl.
CPC ..... *H01M 10/4257* (2013.01); *H01M 2/1038* (2013.01); *H01M 2/30* (2013.01);
(Continued)

(58) Field of Classification Search
CPC ......... H01M 10/4257; H01M 10/0436; H01M 2220/30; H01M 2/0222
(Continued)

(56) References Cited

U.S. PATENT DOCUMENTS 5,601,941 A 2/1997 Tuttle
5,993,248 A 11/1999 Bethurum
(Continued)

FOREIGN PATENT DOCUMENTS

CN 101010815 A 8/2007
CN 103384927 A 11/2013
(Continued)

OTHER PUBLICATIONS

English translation of WO2012/147375A1, Hashimoto, Nov. 2012, WIPO.*
(Continued)

*Primary Examiner* — Mark F Huff
*Assistant Examiner* — Rashid Alam
(74) *Attorney, Agent, or Firm* — Westerman, Hattori, Daniels & Adrian, LLP (57) ABSTRACT

The battery unit (1) includes a flat battery (2) having a cylindrical positive electrode can (10) with a bottom and a cylindrical negative electrode can (20) with a bottom that covers an opening side of the positive electrode can and having a side wall of the positive electrode can on the opening side fitted to an outer circumferential surface of a side wall of the negative electrode can and a substrate (61) provided on a flat surface of one of the negative electrode can and the positive electrode can and mounted with circuit components (62) thereon. The other of the negative electrode can and the positive electrode can that has a flat surface on an opposite side to the substrate in a thickness-wise direction of the flat battery serves as an external terminal for one of a positive electrode and a negative electrode.

5 Claims, 5 Drawing Sheets (51) Int. Cl.
 *H01M 2/30* (2006.01)
 *H01M 2/02* (2006.01)
 *H01M 10/04* (2006.01)

(52) U.S. Cl.
 CPC ........ *H01M 10/425* (2013.01); *H01M 2/0222* (2013.01); *H01M 10/0427* (2013.01); *H01M 10/0436* (2013.01); *H01M 2220/30* (2013.01)

(58) Field of Classification Search
 USPC .......................................................... 429/7
 See application file for complete search history.

(56) References Cited

U.S. PATENT DOCUMENTS

| | | | |
|---|---|---|---|
| 6,016,255 | A | 1/2000 | Bolan et al. |
| 6,109,530 | A * | 8/2000 | Larson ............... G06K 19/0702 235/492 |
| 6,368,744 | B1 | 4/2002 | Hatazawa et al. |
| 2002/0004163 | A1 | 1/2002 | Matsuura |
| 2004/0038585 | A1 | 2/2004 | Sugimoto et al. |
| 2004/0170897 | A1* | 9/2004 | Oyama ................. B22F 9/082 429/229 |
| 2006/0127752 | A1 | 6/2006 | Gray et al. |
| 2007/0207380 | A1 | 9/2007 | Tononishi |
| 2008/0102368 | A1 | 5/2008 | Sumida et al. |
| 2009/0136843 | A1 | 5/2009 | Yamamoto et al. |
| 2010/0159289 | A1* | 6/2010 | Kim .................... H01M 2/0404 429/7 |
| 2011/0064972 | A1* | 3/2011 | Park .................... H01M 2/0408 429/7 |
| 2013/0323538 | A1 | 12/2013 | Tanii et al. |
| 2014/0050948 | A1 | 2/2014 | Hashimoto et al. |

FOREIGN PATENT DOCUMENTS

| | | | |
|---|---|---|---|
| CN | 103493246 A | | 1/2014 |
| EP | 0 971 410 A2 | | 1/2000 |
| EP | 1026761 A1 | | 8/2000 |
| EP | 2 680 338 A1 | | 1/2014 |
| EP | 2704231 A1 | | 3/2014 |
| JP | 51-114622 U | | 9/1976 |
| JP | 56-154092 U | | 11/1981 |
| JP | 2-57236 U | | 4/1990 |
| JP | 08-167403 A | | 6/1996 |
| JP | 11-233088 A | | 8/1999 |
| JP | 2002-026173 A | | 1/2002 |
| JP | 2003-272587 A | | 9/2003 |
| JP | 2004-087191 A | | 3/2004 |
| JP | 2004-247256 A | | 9/2004 |
| JP | 2006-210167 A | | 8/2006 |
| JP | 2009-152183 A | | 7/2009 |
| JP | 3159789 U | | 5/2010 |
| JP | 2010-205700 A | | 9/2010 |
| JP | 2010205700 A | * | 9/2010 |
| WO | 2012/147375 A1 | | 11/2012 |
| WO | WO 2012147375 A1 | * | 11/2012 |

OTHER PUBLICATIONS

English translatino of JP 2010205700, Takai, Sep. 2010.*
International Search Report dated Mar. 19, 2012, issued in corresponding application No. PCT/JP2012/050392.
Written Opinion dated Mar. 19, 2012, issued in corresponding application No. PCT/JP2012/050392.
International Search Report dated Mar. 6, 2012, for application No. PCT/JP2012/050208, corresponding to U.S. Appl. No. 14/113,701.
Chinese Official communication dated May 9, 2014, for Chinese Patent Application No. 201280020400.8, corresponding to U.S. Appl. No. 14/113,701.
Extended European Search Report dated Sep. 16, 2014 issued in related European Application No. 12776977.6 (5 pages), corresponding to U.S. Appl. No. 14/113,701.
Office Action dated Jan. 9, 2014, issued in U.S. Appl. No. 14/113,701 (14 pages).
Office Action dated Jun. 6, 2014, issued in U.S. Appl. No. 14/113,701 (7 pages).
Notice of Allowance and Fee(s) Due dated Sep. 2, 2014, issued in U.S. Appl. No. 14/113,701 (9 pages).
Chinese Office Action dated Feb. 11, 2015, issued in corresponding CN Patent Application No. 201280066379.5 with English translation (18 pages).
Extended European Search Report dated May 8, 2015, issued in counterpart application No. 12865376.3 (7 pages).
Office Action dated Jun. 2, 2015, issued in counterpart Japanese application No. 2013-553136 (w/English translation) (6 pages).
Communication from European Examining Division dated Feb. 11, 2016, issued in counterpart European Patent Application No. 12865376.3. (5 pages).

* cited by examiner

BATTERY UNIT

TECHNICAL FIELD

The present invention relates to a battery unit including a flat battery and a substrate.

BACKGROUND ART

There has been a known structure including a battery, a protection circuit, and other elements as a unit as disclosed for example by JP-A 2009-152183, according to which a coin type secondary battery is stored in a battery case that has a substrate mounted with circuit components thereon and provided with positive and negative deriving electrodes (external electrodes) formed thereon. In this way, the battery unit having the circuit portion and the coin type secondary battery can be used for a device similarly to a coin type primary battery.

DISCLOSURE OF THE INVENTION

Meanwhile, according to the disclosure of JP-A 2009-152183, the positive and negative electrodes as the external electrodes are formed on one surface of the substrate, and therefore the battery cannot be used as a power source for a device provided with terminals to be connected to an exterior can and a sealing can of a coin type battery.

Therefore, it is an object of the present invention to provide a battery unit having a flat battery and a substrate that is available as a power source for a device provided with terminals to be contacted to an exterior can and a sealing can of a flat battery.

A battery unit according to one embodiment of the invention includes a flat battery having a cylindrical exterior can with a bottom and a cylindrical sealing can with a bottom that covers an opening of the exterior can and having a portion of a side wall of the exterior can that is adjacent the opening fitted on an outer circumferential surface of a side wall of the sealing can and a substrate provided on a flat surface of one of the sealing can and the exterior can and mounted with a circuit component thereon. One of the sealing can and the exterior can has a flat surface that is a side of the flat battery opposite to a side thereof adjacent the substrate in a thickness-wise direction of the flat battery, and serves as an external terminal having one of positive and negative polarities (a first feature).

In this arrangement, one of the exterior can and the sealing can having the flat surface that is the side of the flat battery opposite to the side thereof adjacent the substrate in the thickness-wise direction of the flat battery can be used as it is as the external terminal having one polarity. This eliminates the necessity of forming an external terminal having the polarity at the battery unit, so that one external terminal can be obtained for the battery unit with a simple structure.

Furthermore, in the above-described arrangement, if for example an external terminal having the other polarity is formed at the substrate, the battery unit having the above-described structure can be used as a power source for a device provided with terminals to be contacted to an exterior can and a sealing can of a flat battery.

According to the first feature, the substrate may be mounted with the circuit component on a surface facing to the flat surface and may have an external terminal having the other of the positive and negative polarities formed on a surface opposite to the surface facing to the flat surface side (a second feature).

In this way, the battery unit can be used as a power source for a device provided with terminals to be contacted to the exterior can and the sealing can of a flat battery. More specifically, the external terminal formed at the substrate is formed to be exposed to the outside of the battery unit, so that the external terminal formed at the substrate and one of the exterior can and the sealing can having the flat surface that is the side of the flat battery opposite to the side thereof adjacent the substrate in the thickness-wise direction of the flat battery serve as external terminals. In this way, the terminals in contact with the exterior can and the sealing can in the device can be contacted to the external terminals of the battery unit.

Furthermore, the circuit component is mounted on the surface of the substrate facing to the flat battery, so that the circuit component can be prevented from being exposed to the outside. In this way, the circuit component mounted on the substrate can be protected.

According to the first or second feature, the flat surface may be a flat surface of the sealing can, the flat battery has a protrusion formed by the flat surface of the sealing can that protrudes with respect to the exterior can, and the substrate is provided with a projection corresponding to the protrusion of the flat battery on a surface opposite to a surface facing to the flat surface (a third feature).

In this way, the projection can be formed at the battery unit corresponding to the protrusion of the flat battery. When the device has an attachment portion to which the protrusion of the flat battery is to be positioned, the projection of the battery unit can be positioned at the attachment portion. Therefore, in the above-described structure, the battery unit can be positioned to the device in the same manner as the flat battery.

One of the first to third features may further include an exterior member used to cover circumferences of the substrate and the other of the sealing can and the exterior can while the outer circumferential side of said one of the sealing and exterior cans is exposed (a fourth feature).

In this way, without preventing one of the sealing can and the exterior can having the flat surface that is the side of the flat battery opposite to the side thereof adjacent the substrate in the thickness-wise direction of the flat battery from a contacting terminal on the device, the substrate and the other of the sealing can and the exterior can can be covered with the exterior member. In other words, the outer circumference of one of the sealing can and the exterior can having the flat surface that is the side of the flat battery opposite to the side thereof adjacent substrate in the thickness-wise direction of the flat battery is exposed without being covered with the exterior member and can surely be contacted by the terminal on the device. On the other hand, the substrate and the other of the sealing can and the exterior can having the flat surface provided with the substrate thereon have their outer circumferences covered with the exterior member and can be protected by the exterior member.

One of the first to fourth features further may include a spacer provided between the substrate and the flat surface and at least a part of the spacer is made of an anisotropic conductive material that can electrically connect the substrate and the flat surface and can carry out electrical insulation in an in-plane direction of the flat surface (a fifth feature).

In this way, the spacer provided between the substrate and the flat surface of the flat battery can be used as a connection member to electrically connect the substrate and the flat surface. More specifically, at least a part of the spacer is made of the anisotropic conductive material that can electrically connect the substrate and the flat surface, so that the substrate and the flat surface of the flat battery can be connected electrically. On the other hand, the anisotropic conductive material that forms the part of the spacer is electrically insulating in an in-plane direction of the flat surface, so that short-circuiting with another member positioned between the substrate and the flat surface can be prevented. Therefore, in this way, the connection structure between the substrate and the flat surface can be achieved by simple arrangement.

In the battery unit according to the embodiment of the invention, one of the sealing can and the exterior can having a flat surface that is a side of the flat battery opposite to a side adjacent the substrate in the thickness-wise direction of the flat battery is used as an external terminal having one polarity in the battery unit. In this way, a battery unit available as a power source for a device provided with terminals to be contacted to a sealing can and an exterior can of a flat battery can be provided.

MODE FOR CARRYING OUT THE INVENTION

In the following, embodiments of the present invention will be described in detail in conjunction with the accompanying drawings, in which the same or corresponding portions are designated by the same reference characters and their description will not be repeated.

First Embodiment

Overall Structure

Figure 1:
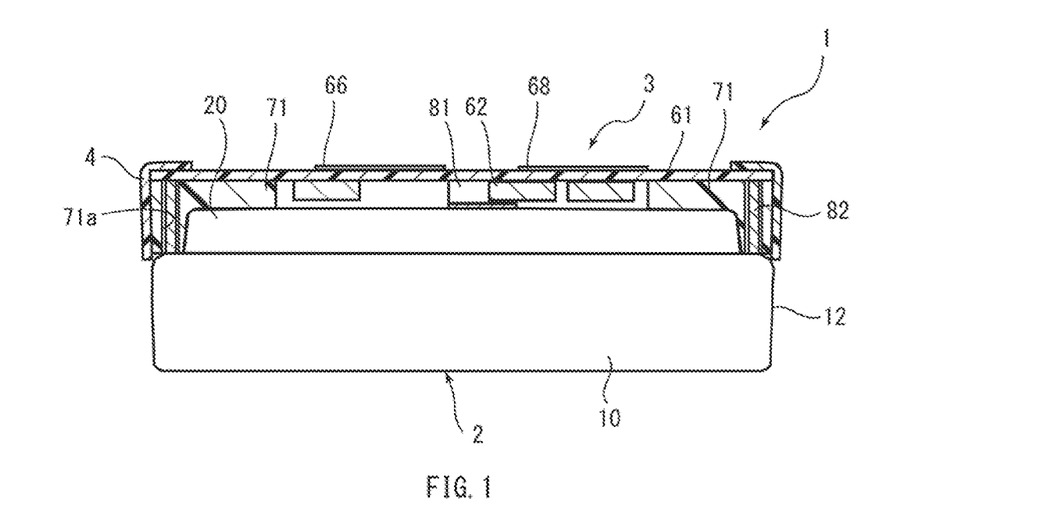
FIG. 1 is a sectional view of components other than a flat battery in a battery unit according to a first embodiment of the invention.

FIG. 1 is a view of a general structure of a battery unit 1 according to a first embodiment of the present invention. The battery unit 1 includes an integral arrangement of a coin shaped flat battery 2 and a circuit portion 3. The battery unit 1 is for example used as a power source for a small size device that uses a coin type battery such as a pedometer, a hearing aid, an electronic key for automobile, an IC tag, and a sensor unit. Note that the battery unit 1 is a secondary battery unit that allows the flat battery 2 to be charged.

More specifically, as shown in FIG. 1, in the battery unit 1, the circuit portion 3 is fixed as it is layered on an upper surface of the flat battery 2. The circuit portion 3 has a shape and a size substantially equal to those of the outer shape of the flat battery 2 as viewed in a direction in which the flat battery 2 and the circuit portion 3 are placed on each other. In this way, the flat battery 2 and the circuit portion 3 can be arranged in a compact manner in the thickness-wise direction while the battery unit 1 can have a shape and a size substantially equal to those of the flat battery 2 as viewed in the direction in which the flat battery 2 and the circuit portion 3 are placed on each other.

As will be described in detail, various terminals 66 to 68 (that will be described) are formed on a surface of a circuit substrate 61 of the circuit portion 3 that is opposite to a surface facing to the flat battery 2. In this way, in the battery unit 1, while the flat battery 2 and the circuit portion 3 are assembled as shown in FIG. 1, the terminals 66 to 68 are exposed.

Furthermore, as shown in FIG. 1, a part of a side surface of the layered body including the flat battery 2 and the circuit portion 3 fixed as they are layered on each other is covered with a tube 4 (exterior member) of a thermally shrinkable resin material such as PET (polyethylene terephthalate). More specifically, the tube 4 is provided on a part of the side surface of the layered body that corresponds to the circuit portion 3 and a negative electrode can 20 (that will be described) of the flat battery 2. More specifically, the tube 4 is provided on the side surface of the layered body to expose a circumferential wall 12 of a positive electrode can 10 that will be described. The tube 4 covers not only the part of the side surface of the layered body but also an outer circumference of the circuit substrate 61 that forms an end surface of the layered body.

In this way, the layered body may have improved strength and the side surface of the layered body may have improved appearance. Also as described above, the tube 4 is provided at the part of the side surface of the layered body that corresponds to the circuit portion 3 and the negative electrode can 20 and the circumferential wall 12 of the positive electrode can 10 is exposed, so that a terminal of a device can be contacted to the circumferential wall 12 of the positive electrode can 10. In this way, the battery unit 1 according to the embodiment can be used as a power source for a device provided with a terminal to be contacted to the circumferential wall 12 of the positive electrode can 10. In other words, the positive electrode can 10 serves as an external terminal for the positive electrode in the battery unit 1.

Furthermore, in the above-described arrangement, a step as thick as the tube 4 forms at an end surface of the layered body (on the circuit substrate 61), so that the terminals 66 to 68 formed at the circuit substrate 61 positioned at the end surface of the layered body are positioned inward of the tube 4 in the layering direction. In this way, the terminals 66 to 68 are less prone to damages.

In the following, the flat battery 2 and the circuit portion 3 will be described in detail with reference to FIGS. 1 to 4.

Flat Battery

Figure 2:
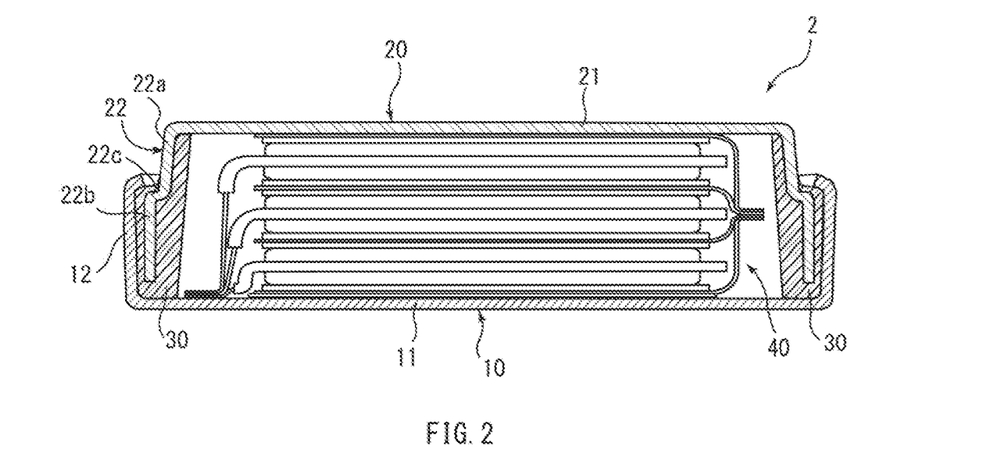
FIG. 2 is a sectional view of components other than an electrode member in the flat battery.

As shown in FIG. 2, the flat battery 2 includes the positive electrode can 10 (one member) as a cylindrical exterior can with a bottom, the negative electrode can 20 (the other member) as a sealing can that covers an opening of the positive electrode can 10, a gasket 30 provided between the inner circumference of the positive electrode can 10 and the circumference of the negative electrode can 20, and an electrode member 40 stored in a space formed between the positive electrode can 10 and the negative electrode can 20. Therefore, the flat battery 2 is formed to have a flat coin shape as a whole as the positive electrode can 10 and the negative electrode can 20 are joined. A non-aqueous electrolyte (not shown) is also enclosed in the space formed between the positive electrode can 10 and the negative electrode can 20 in addition to the electrode member 40. Note that according to the embodiment, the flat battery 2 is formed as a lithium ion battery.

The positive electrode can 10 is made of a metal material such as stainless steel and formed to have a cylindrical shape with a bottom for example by press-molding. The positive electrode can 10 includes a circular bottom 11 (flat surface) and a cylindrical circumferential wall 12 (side wall) formed continuously with the bottom 11 at its outer circumference. The circumferential wall 12 is provided to extend substantially perpendicularly from the outer circumferential end of the bottom 11 when viewed in a longitudinal section (in a state shown in FIG. 1). As will be described, while the gasket 30 is held between the positive electrode can 10 and the negative electrode can 20, the open end of the circumferential wall 12 is bent inwardly and caulked to the negative electrode can 20. In this way, the bottom 11 of the positive electrode can 10 forms the bottom of the flat battery 2.

The negative electrode can 20 is also made of a metal material such as stainless steel and formed to have a cylindrical shape with a bottom by press-molding similarly to the positive electrode can 10. The negative electrode can 20 has a cylindrical circumferential wall 22 (side wall) whose outer size is smaller than that of the circumferential wall 12 of the positive electrode can 10 and a circular flat surface 21 that blocks one opening of the cylindrical circumferential wall. Therefore, the flat surface 21 of the negative electrode can 20 forms the upper surface of the flat battery 2.

The circumferential wall 22 of the negative electrode can 20 is provided to extend substantially perpendicularly with respect to the flat surface 21 when viewed in a longitudinal section similarly to the positive electrode can 10. The circumferential wall 22 has a large diameter part 22b whose diameter increases stepwise as compared to a base end 22a on the side of the flat surface 21. More specifically, the circumferential wall 22 has a stepped part 22c formed between the base end 22a and the large diameter part 22b. As shown in FIG. 2, the open end of the circumferential wall 12 of the positive electrode can 10 is bent and caulked to the stepped part 22c. More specifically, the circumferential wall 12 of the positive electrode can 10 has its open end fitted to the stepped part 22c of the negative electrode can 20.

Circuit Portion

As shown in FIG. 1, the circuit portion 3 includes a circuit substrate 61 (substrate) and a plurality of circuit components 62 mounted on the circuit substrate 61. The plurality of circuit components 62 are mounted together on one surface of the circuit substrate 61. Examples of the circuit components 62 include a protection IC that forms a protection circuit, a charging IC that forms a charging circuit, and a DC/DC converter that carries out voltage conversion. Using the DC/DC converter provided in the battery unit 1, voltage to be output from the battery unit 1 can conform to the rated voltage of an electrical device to be used even if the rated voltage of the flat battery 2 is different from the rated voltage of the electrical device. Therefore, the battery unit 1 can be formed using flat batteries with various kinds of rated voltage. Although not detailed, the circuit portion 3 is adapted to change the output voltage when the remaining capacity of the flat battery 2 is reduced, so that the remaining capacity of the flat battery 2 is detected.

As shown in FIG. 1, the circuit substrate 61 is formed to have a shape (circular) and a size substantially equal to those of the flat battery 2 when seen in a plan view. In this way, the battery unit 1 can be prevented from having a larger size than the diameter of the flat battery 2 because of the circuit substrate 61.

Figure 4:
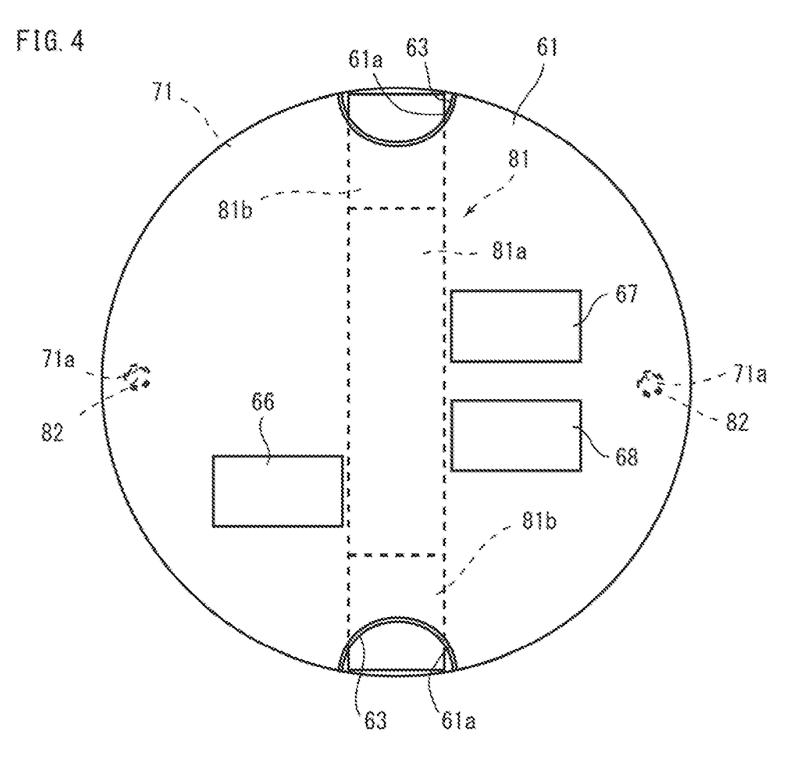
FIG. 4 is a top view showing a state in which a circuit substrate is placed on the structure shown in FIG. 3.

As shown in FIG. 4, the circuit substrate 61 is provided with two semicircular notches 61a at its outer circumference. These notches 61a are provided at intervals of about 180° on the outer circumference of the circuit substrate 61. The notches 61a are each provided with a substrate terminal 63 formed for example by plating tin at a side surface of the circuit substrate 61. Although not shown, the substrate terminals 63 provided at the notches 61a are electrically connected to a circuit (not shown) formed by the circuit components 62 mounted on the circuit substrate 61.

As described above, providing the substantially semicircular notches 61a at the circuit substrate 61 makes it easier for solder to be distributed when the substrate terminals 63 formed on the notches 61a are connected to the battery negative electrode terminal 81 of the flat battery 2 by soldering as will be described. In this way, the substrate terminals 63 of the circuit substrate 61 and the battery negative electrode terminal 81 of the flat battery 2 can be connected more securely by soldering.

Note that the notches 61a are covered with the above-described tube 4 that covers the side surface of the layered body including the flat battery 2 and the circuit portion 3. In this way, the substrate terminals 63 provided at the notches 61a can be prevented from being exposed.

As shown in FIGS. 1 and 4, the GND terminal (external terminal) 66, the charging terminal 67, and the charging indication signal terminal 68 are provided at a surface of the circuit substrate 61 without the circuit components 62. More specifically, as shown in FIG. 1, the plurality of circuit components 62 are mounted on one surface of the circuit substrate 61 and the terminals 66 to 68 are provided together on the other surface. The terminals 66 to 68 are positioned inward, as measured in a radial direction of the circuit substrate 61, of the tube 4 positioned at the end surface of the layered body, so that the terminals do not overlap the tube 4 that covers a part of the side surface of the layered body including the flat battery 2 and the circuit portion 3. Note that the terminals 66 to 68 may be arranged differently from that in FIG. 4.

The circuit substrate 61 has a plurality of through holes and a metal material filled in the through holes electrically connects the circuit (not shown) formed by the circuit components 62 on the circuit substrate 61 and the terminals 66 to 68.

The circuit (not shown) formed by the circuit components 62 on the circuit substrate 61 and the GND terminal 66 are electrically connected and the substrate terminals 63 and the circuit (not shown) on the circuit substrate 61 are electrically connected as described above, so that the GND terminal 66 and the substrate terminals 63 can be connected electrically. In this way, when the substrate terminals 63 are connected with a battery negative electrode terminal 81 of the flat battery 2, the flat battery 2 and the GND terminal 66 can be connected electrically as will be described.

The charging terminal 67 is electrically connected to a battery positive electrode terminal 82 that will be described through the circuit (not shown) formed by the circuit components 62. The battery positive electrode terminal 82 is electrically connected to the exterior can 10 as the positive electrode of the flat battery 2, so that the charging terminal 67 is electrically connected to the exterior can 10. In this way, the flat battery 2 can be charged through the charging terminal 67.

As shown in FIG. 1, the circuit substrate 61 is held on the negative electrode can 20 of the flat battery 2 through a spacer 71. More specifically, the circuit substrate 61 is soldered to the battery negative electrode terminal 81 attached to the negative electrode can 20 that will be described as it is provided a prescribed distance apart from the negative electrode can 20 of the flat battery 2 by the spacer 71. In this way, the circuit substrate 61 is fixed at the negative electrode can 20 that is less prone to deformation in the flat battery 2, so that if the flat battery 2 deforms, electrical connection between the circuit portion 3 and the flat battery 2 can be secured.

Note that an elastic adhesive may be filled between the circuit substrate 61 and the negative electrode can 20 of the flat battery 2. The use of the elastic adhesive for adhering the flat battery 2 and the circuit portion 3 further ensures that even members having different thermal deformation amounts can be adhered with each other by the adhesive.

The spacer 71 may be a member of a resin material such as ABS resin (acrylonitrile butadiene styrene copolymer synthetic resin) and phenolic resin and has a substantially donut shape. As shown in FIG. 1, the spacer 71 has a thick outer circumferential part along a stepped portion between the negative electrode can 20 and the positive electrode can 10 of the flat battery 2 so as to fill the stepped portion. More specifically, the spacer 71 is formed to extend to the caulking part (hereinafter also referred to as the "shoulder") of the positive electrode can 10 to the negative electrode can 20. The spacer 71 has a thickness to provide a prescribed distance between the flat battery 2 and the circuit substrate 61 so that the circuit components 62 are not in contact with the flat battery 2 (see FIG. 1). In this way, while a space for providing the circuit components 62 is provided on the negative electrode can 20 of the flat battery 2, the circuit components 62 can be prevented from contacting the flat battery 2 and being damaged if the flat battery 2 deforms.

The spacer 71 has through holes 71a into which the battery positive electrode terminal 82 is inserted. More specifically, as shown in FIGS. 1 and 4, the through holes 71a are provided at two positions 180° apart from each other in the circumferential direction of the spacer 71 and formed through the spacer 71 in the thickness-wise direction of the spacer. As shown in FIG. 1, the through holes 71a are formed at the outer circumferential thick part of the spacer 71. Note that the battery positive electrode terminal 82 is electrically connected to the charging terminal 67 and the positive electrode can 10 and serves as a terminal through which current is passed while the flat battery 2 is charged.

The circuit substrate 61 is placed on the spacer 71 so that the circuit components 62 are positioned inside the substantially donut shaped spacer 71 (see FIG. 1). In this way, the circuit substrate 61 having the circuit components 62 mounted thereon can be provided in a compact manner with respect to the flat battery 2. The above-described arrangement keeps the circuit components 62 from being exposed to the outside of the battery unit 1, and therefore a user or anyone can be prevented from touching the circuit components 62.

Battery Negative Electrode Terminal

Figure 3:
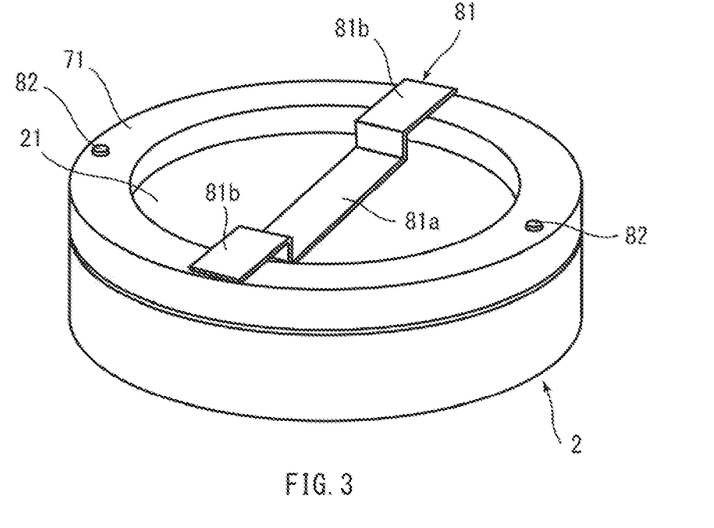
FIG. 3 is a perspective view showing a state in which a spacer, a battery negative electrode terminal, and a battery positive electrode terminal are attached to the flat battery.

As shown in FIG. 3, the battery negative electrode terminal 81 is provided on a flat surface 21 of the negative electrode can 20 of the flat battery 2. The battery negative electrode terminal 81 is formed by bending a rectangular plate member of a conductive metal material so that the lengthwise center of the plate member protrudes in the thickness-wise direction. More specifically, the battery negative electrode terminal 81 is a member including, in an integral form, a battery connection portion 81a connected to the flat surface 21 of the negative electrode can 20 of the flat battery 2 and substrate connection portions 81b on both sides of the battery connection portion 81a. The battery connection portion 81a protrudes from the substrate connection portions 81b in the thickness-wise direction of the member. The battery connection portion 81a protrudes from the substrate connection portions 81b by such a height that the substrate connection portions 81b of the battery negative electrode terminal 81 attached to the flat battery 2 with the spacer 71 placed on the flat battery 2 is positioned on the spacer 71.

The battery connection portion 81a is fixed to the flat surface 21 of the negative electrode can 20 of the flat battery 2 by welding. More specifically, the one of the sides of the battery connection portion 81a that is the protruding side of the battery negative electrode terminal 81 is fixed to the central part of the flat surface 21 of the negative electrode can 20 by welding so that the substrate connection portions 81b of the battery negative electrode terminal 81 are placed on the spacer 71. In this way, the battery negative electrode terminal 81 can be fixed to the flat battery 2. Furthermore, the battery connection portion 81a forms a part dented from the substrate connection portions 81b, and therefore the circuit components 62 mounted to the circuit substrate 61 can be provided in the dent. Therefore, a larger number of circuit components 62 can be provided between the circuit substrate 61 and the flat battery 2.

The substrate connection portions 81b are fixed to the circuit substrate 61 by soldering. More specifically, as shown in FIG. 4, the substrate connection portions 81b are soldered with the substrate terminals 63 while the substrate terminals 63 provided in the notches 61a of the circuit substrate 61 are positioned thereon. In this way, the substrate connection portions 81b are connected to the side surface of the circuit substrate 61.

In the above-described structure, the plurality of notches 61a are provided on the outer circumference of the circuit substrate 61 and the substrate terminals 63 formed in the notches 61a and the battery negative electrode terminal 81 of the flat battery 2 are electrically connected. In this way, the circuit formed on the circuit substrate 61 and the battery negative electrode terminal 81 of the flat battery 2 can be connected electrically on the side surface of the circuit substrate 61 and therefore as compared to the case of soldering tip ends of terminals provided through a circuit substrate, the battery unit 1 can have a reduced thickness. More specifically, in the above-described structure, a tip end of a terminal does not project from the circuit substrate or the thickness is not increased because of the solder, and therefore the thickness of the battery unit 1 can be reduced.

Method of Manufacturing Battery Unit

Now, a method of manufacturing the battery unit 1 having the above-described structure will be described with reference to FIGS. 5 and 6.

Figure 5:
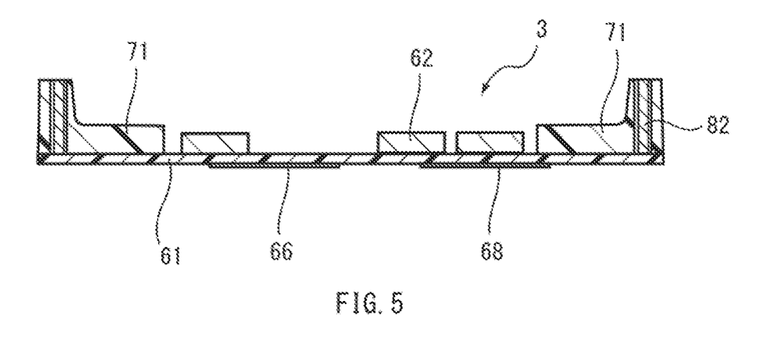
FIG. 5 is a sectional view of a general structure of a circuit portion produced in an example of a method of manufacturing the battery unit.

As shown in FIG. 5, the plurality of circuit components 62 are mounted on one surface of the circuit substrate 61 to form the circuit portion 3. The various terminals 66 to 68 are formed on the other surface of the circuit substrate 61. A method of mounting the circuit components 62 to the circuit substrate 61 and a method of forming the terminals 66 to 68 are the same as conventional methods, and therefore will not be described in detail.

On the other hand, the spacer 71 is adhesively fixed on the flat battery 2 by an elastic adhesive and the battery negative electrode terminal 81 is fixed to the flat surface 21 of the negative electrode can 20 of the flat battery 2 by welding (as shown in FIG. 3).

Figure 6:
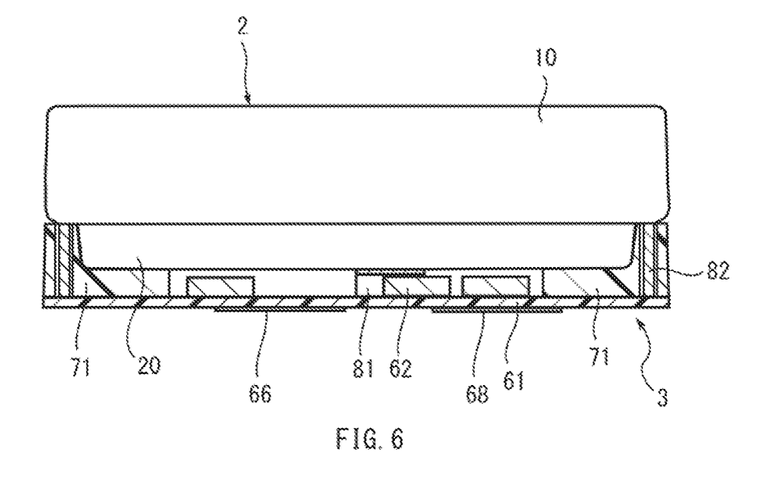
FIG. 6 is a view showing a state in which the flat battery is attached to the circuit portion in an example of a method of manufacturing the battery unit.

Then, as shown in FIG. 6, the circuit substrate 61 of the circuit portion 3 is provided to the flat battery 2 provided with the spacer 71 and the battery negative electrode terminal 81. Then, the substrate terminals 63 provided in the notches 61a of the circuit substrate 61 and the battery negative electrode terminal 81 are connected by soldering.

Then, the tube 4 is fitted to a part of the side surface of the layered body including the flat battery 2 and the circuit portion 3 formed as described above, followed by heating, so that the tube 4 is let to shrink. Note that the tube 4 has a length to cover the part corresponding to the sealing can 20 and the circuit portion 3 and a part of the outer circumference of both end surfaces of the layered body as it is fitted to the side surface of the layered body.

In this way, the battery unit 1 having the structure as shown in FIG. 1 is obtained.

Advantages of First Embodiment

According to the embodiment, the external terminal for the negative electrode is provided at the circuit substrate 61 of the circuit portion 3 in the battery unit 1 including the flat battery 2 and the circuit portion 3, while the positive electrode can 10 of the flat battery 2 is used as an external terminal for the positive electrode of the battery unit 1. More specifically, in the flat battery 2, the positive electrode can 10 having a bottom 11 (flat surface) on the opposite side to the circuit substrate 61 in the thickness-wise direction serves as an external terminal for the positive electrode. In this way, the external terminal for the positive electrode is provided on one side of the battery unit 1 in the thickness-wise direction while the external terminal for the negative electrode is provided on the other side of the battery unit 1 in the thickness-wise direction. Therefore, the battery unit 1 can be used as a power source for a device provided with terminals to be contacted to upper and lower surfaces of a flat battery.

Furthermore, the external terminal for the positive electrode of the battery unit 1 can be obtained by the simple arrangement.

Also according to the embodiment, a part positioned on the side surface of the layered body including the flat battery 2 and the circuit portion 3 placed on each other and corresponding to the sealing can 20 of the flat battery 2 and the circuit portion 3 is covered with the tube 4 while the circumferential wall 12 of the exterior can 10 of the flat battery 2 is exposed. In this way, the exterior can 10 serving as the external terminal for the positive electrode of the battery unit 1 can be exposed, so that contact between the exterior can 10 and a terminal of a device can be secured.

Furthermore, the circuit components 62 are mounted together on the surface of the circuit substrate 61 that is closer to the flat battery 2, so that the circuit components 62 and other elements can be prevented from being exposed to the outside of the battery unit 1. In this way, a user can be prevented from directly touching the circuit components 62 and other elements.

Second Embodiment

Figure 7:
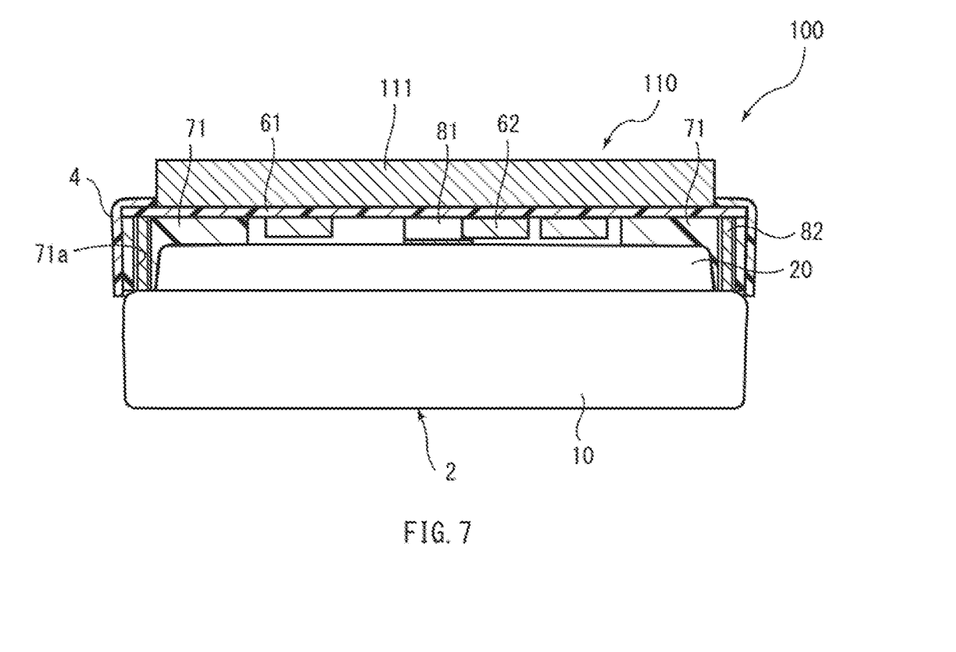
FIG. 7 is a view of a battery unit according to a second embodiment of the invention that corresponds to FIG. 1.

FIG. 7 shows a general structure of a battery unit 100 according to a second embodiment of the present invention. The structure of the battery unit 100 according to the second embodiment is different from that according to the first embodiment in that a projection 111 is formed on the circuit substrate 61. In the following, the same elements as those according to the first embodiment are designated by the same reference characters and their description will not be provided, in other words, only the different arrangement from the first embodiment will be described.

As shown in FIG. 7, a circuit portion 110 has the projection 111 in a substantially columnar shape on a circuit substrate 61. The projection 111 is formed on the circuit substrate 61 corresponding to the sealing can of the flat battery. Here, in the flat battery, the sealing can has a protrusion with respect to the exterior can as shown in FIG. 2. The projection 111 is formed to project outwardly from the battery unit 100 corresponding to the protrusion.

The projection 111 is made of a metal material such as iron and plated with nickel or tin on its surface adjacent to the circuit substrate 61. In this way, the projection 111 can be soldered easily on the circuit substrate 61. Note that the projection 111 can also serve as a GND terminal or a GND terminal may be provided at the circuit substrate 61 separately from the projection 111. Although not shown, other terminals such as a charging terminal are provided at the circuit substrate 61 separately from the projection 111.

The above-described projection 111 is provided on the circuit substrate 61, so that the projection can be positioned in an attachment portion provided in a device to which the protrusion of the flat battery is positioned.

Advantages of Second Embodiment

According to the second embodiment, the projection 111 is provided on the circuit substrate 61 of the circuit portion 110, so that the outer shape of the battery unit 100 can be the same as that of the flat battery. In this way, the battery unit 100 can be attached to a device provided with an attachment portion to which the protrusion of the flat battery is positioned and used as a power source.

Third Embodiment

Figure 8:
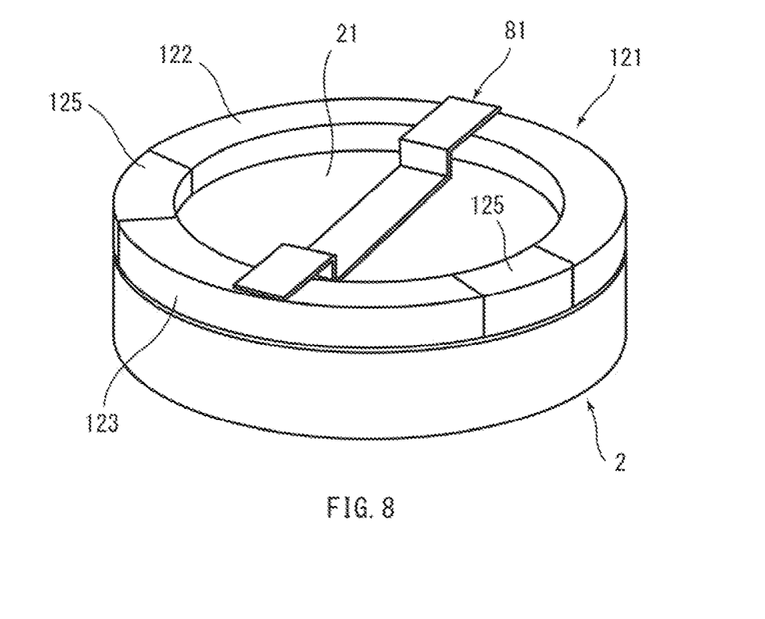
FIG. 8 is a view of a battery unit according to a third embodiment of the invention that corresponds to FIG. 3.

FIG. 8 shows a state in which a spacer 121 and a battery negative electrode terminal 81 are attached to a flat battery 2 in a battery unit according to a third embodiment of the invention. The battery unit according to the third embodiment is different from the first embodiment in that a part of the spacer 121 is used as a battery negative electrode terminal 125. In the following description, the same elements as those in the first embodiment are designated by the same reference characters and their description will not be repeated, in other words, only the different arrangement from the first embodiment will be described.

As shown in FIG. 8, the spacer 121 has circular-arc shaped spacer pieces 122 and 123 and circular-arc shaped battery negative electrode terminals 125. The spacer pieces 122 and 123 have their ends positioned a prescribed distance apart from each other to form a part of a circle. The battery negative electrode terminals 125 are provided between the spacer pieces 122 and 123 to form an annular shape together with the spacer pieces 122 and 123. In this way, the annular shape as shown in FIG. 8 is formed by the spacer pieces 122 and 123 and the battery negative electrode terminals 125. The battery negative electrode terminal 125 has a thickness substantially equal to that of the spacer pieces 122 and 123. Therefore, the battery negative electrode terminals 125 serve as a part of the spacer 121.

The battery negative electrode terminals 125 are made of anisotropic conductive rubber having different kinds of conductivity between its thickness-wise direction and in-plane direction. More specifically, the battery negative electrode terminals 125 are made of a material that is conductive only in the thickness-wise direction and insulating in the in-plane direction. The battery negative electrode terminals 125 are for example a member including an insulating rubber material such as silicone rubber and a plurality of fine metal wires extending in the thickness-wise direction and buried therein. In this way, the battery negative electrode terminals 125 electrically connect the negative electrode can 20 of the flat battery 2 and the circuit substrate 61 of the circuit portion 3 and are insulative in the in-plane direction of the flat surface 21 of the negative electrode can 20.

Note that according to the embodiment, the battery negative electrode terminals 125 are made of anisotropic conductive rubber but they may be made of any other material as far as the material has anisotropic conductivity.

Advantages of Third Embodiment

According to the embodiment, the spacer 121 is formed by the spacer pieces 122 and 123 and the battery negative electrode terminals 125 that also serve as a spacer, and therefore the spacer and the battery negative electrode terminal may be provided in a compact manner. In addition, the battery negative electrode terminals 125 made of anisotropic conductive rubber can electrically connect the negative electrode can 20 of the flat battery 2 and the circuit substrate 61 of the circuit portion 3 while current can be prevented from passing to components present in the in-plane direction of the flat surface 21 of the negative electrode can 20. Therefore, the battery negative electrode terminals 125 can be used as a spacer while short-circuiting and the like can be prevented.

Other Embodiments

While the embodiment(s) of the present invention has been described, the same is by way of illustration and example only and is not to be taken by way of limitation. The embodiment(s) can therefore be carried out in various modified forms without departing the spirit and scope of the present invention.

According to the above-described embodiments, the circuit substrate 61 is supported by the battery negative electrode terminal 81 of the flat battery 2 while the substrate terminals 63 provided in the notches 61a of the circuit substrate 61 and the battery negative electrode terminal 81 are connected by soldering. However, the terminal arrangement for the flat battery 2 may be any other arrangement as far as the negative electrode can 20 of the flat battery 2 and the circuit substrate 61 can be connected electrically.

According to the above-described embodiments, the notches 61a of the circuit substrate 61 are in a substantially semi-circular shape but the shape may be a circle or a part of a circle or any other shape such as a rectangle.

According to the above-described embodiments, the terminals 66 to 68 of the battery unit 1 each have a rectangular shape but they may have any other shape such as a circular shape.

According to the above-described embodiments, the circuit substrate 61 has a shape and a size equal to those of the outer shape of the flat battery 2 but the circuit substrate 61 may be smaller or larger than upper and lower surfaces of the flat battery 2.

According to the above-described embodiments, a part of the side surface of the layered body including the circuit portion 3 and the flat battery 2 is covered with the tube 4, but the part does not have to be covered with the tube 4. In this way, the battery unit can be even more compact without the tube 4. Alternatively, instead of using the tube according to the embodiments, the part of the side surface of the layered body may be coated with a resin material.

According to the embodiments, the circuit portion 3 is provided on the negative electrode can 20 of the flat battery 2 as a sealing can but the circuit portion 3 may be provided on the positive electrode can 10 as an exterior can. Furthermore, the circuit components 62 of the circuit portion 3 may be mounted on a surface of the circuit substrate 61 that is opposite to the surface facing to the flat battery 2.

According to the above-described embodiments, the positive electrode can 10 is used as an exterior can and the negative electrode can 20 is used as a sealing can but the negative electrode can may be used as an exterior can and the positive electrode can may be used as a sealing can. In the latter case, the battery negative electrode terminal 81 may be used as a battery positive electrode terminal and the battery positive electrode terminal 82 may be used as a battery negative electrode terminal. Also in this case, the negative electrode can serves as an external terminal for the negative electrode of the battery unit.

Figure 9:
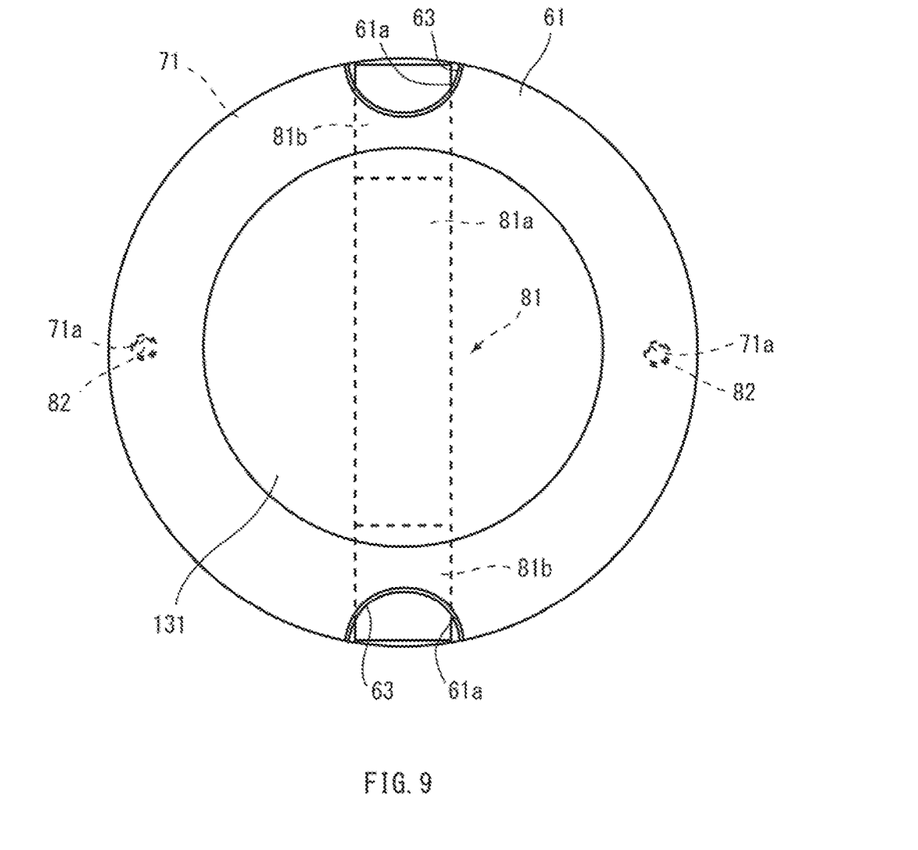
FIG. 9 is a view of a battery unit according to yet another embodiment of the invention that corresponds to FIG. 4.

According to the above-described embodiments, a lithium ion battery is employed as the flat battery 2. However, the flat battery 2 may be any other battery as far as it is a chargeable secondary battery. The flat battery 2 may be a primary battery. If the flat battery 2 is a primary battery, a capacitor or the like is mounted as a circuit portion. If the flat battery 2 is a primary battery, the charging terminal 67 and the charging indication signal terminal 68 for charging are not necessary, and a circular negative electrode terminal 131 (an external terminal of an opposite polarity) may be formed at the substrate 61 as shown in FIG. 9. Note that in FIG. 9, the same elements as those in FIG. 4 are designated by the same reference characters.

According to the above-described embodiments, the circuit components 62 that form the charging circuit are provided in each of the battery units 1 and 100. However, the circuit components 62 that form the charging circuit may be provided outside the battery units. In this case, the battery units do not need the charging terminal 67 and the charging indication signal terminal 68, so that the terminal arrangement for the battery units may be as described above in conjunction with FIG. 9.

According to the second embodiment, the battery unit 100 has the projecting portion formed by the projection 111 provided on the circuit substrate 61 so that the battery unit 100 has the same outer shape as that of the flat battery. However, the projecting portion may be formed using the same material as that of the circuit substrate 61. In this case, the projecting portion and the circuit substrate 61 have the same thermal expansion coefficient, so that the deformation of the battery unit as a whole can be controlled more easily.

INDUSTRIAL APPLICABILITY

The battery unit according to the invention may be used for a structure including a substrate provided with a circuit thereon and a substantially circular flat battery to be mounted to a small device.

What is claimed is:

1. A battery unit used as a power source for a device comprising terminals, the battery unit comprising:
   a coin shaped flat battery having a cylindrical positive electrode exterior can with a bottom and a cylindrical negative electrode sealing can with a bottom that covers an opening of the positive electrode exterior can, the open end of a side wall of the positive electrode exterior can being fitted on an outer circumferential surface of a side wall of the negative electrode sealing can; and
   a single substrate layered above the flat battery and provided on a side of the negative electrode sealing can, the substrate having a circular disc shape, the substrate having:
a circuit component mounted on an inner surface of the substrate facing to the negative electrode sealing can; and
a ground external terminal formed on an outer surface of the substrate opposite to the inner surface and electrically connected to the negative electrode sealing can, and
wherein the positive electrode exterior and the negative external terminal are adapted to respectively contact to the terminals of the device.

2. The battery unit according to claim 1, wherein
the flat battery has a protrusion formed by the negative electrode sealing can that protrudes with respect to the positive electrode exterior can, and
the substrate is provided with a projection corresponding to the protrusion of the flat battery on the outer surface.

3. The battery unit according to claim 1, further comprising an exterior member used to cover circumferences of the substrate and the negative electrode sealing can while a circumference of the positive electrode exterior can is exposed.

4. The battery unit according to claim 1, further comprising a spacer provided between the substrate and the negative electrode sealing can,
at least a part of the spacer being made of an anisotropic conductive material that can electrically connect the substrate and the negative electrode sealing can and can electrically insulate the flat surface in planar direction.

5. The battery unit according to claim 1, further comprising a tube used to cover circumferences of the substrate and the negative electrode sealing can while a circumference of the positive electrode exterior can is exposed.

* * * * *